Jan. 5, 1937.  C. G. BANKS  2,066,711
SWING JOINT
Filed May 9, 1933
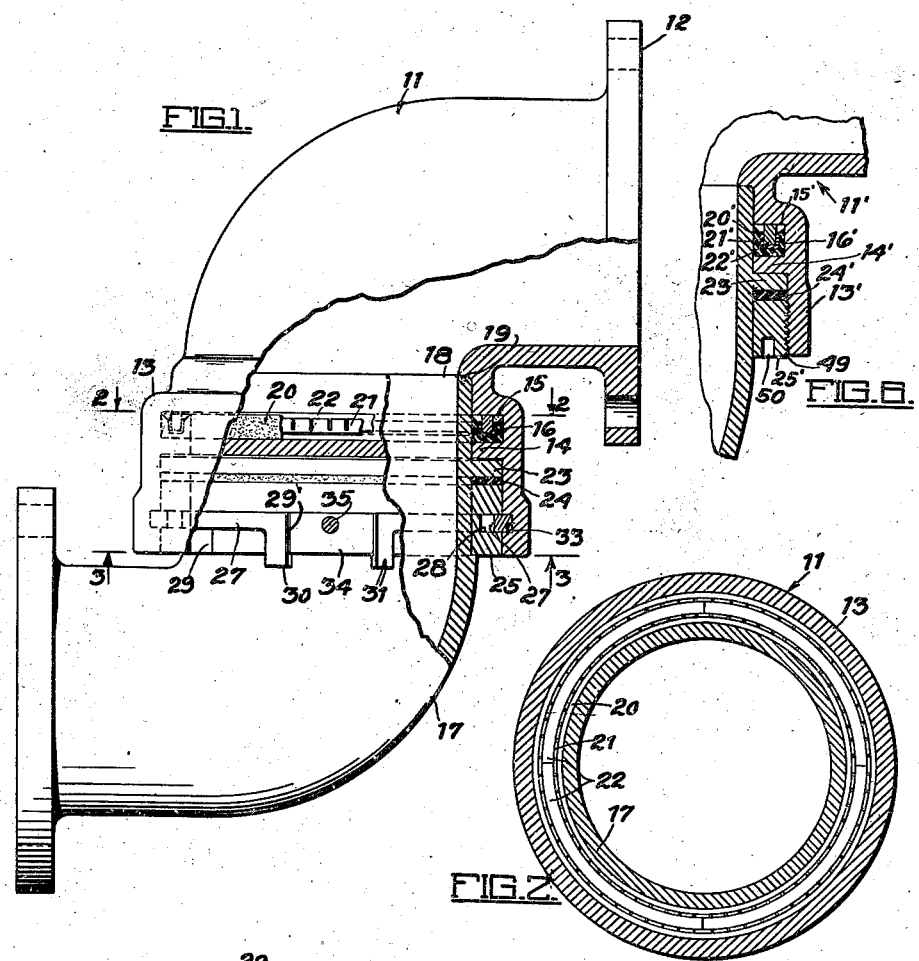
INVENTOR
CHARLES G. BANKS
BY
ATTORNEY Patented Jan. 5, 1937

2,066,711

UNITED STATES PATENT OFFICE 2,066,711

SWING JOINT

Charles G. Banks, Los Angeles, Calif., assignor to Frank L. A. Graham, Los Angeles, Calif.

Application May 9, 1933, Serial No. 670,064

1 Claim. (Cl. 285—9)

This invention has to do in a general way with joints or couplings of the swing or swivel type, and is more particularly related to improvements to joints of the type shown and described in the United States Letters Patent, No. 1,894,390, issued to me on January 17, 1933.

Although the joint contemplated by this invention is especially adapted for use in rotary hose of the type shown in my patent above referred to and in dock or loading hose for delivering liquids to tankers and the like, it will find numerous applications to other uses where it is desired to have a flexible joint in a conduit composed of substantially rigid sections adapted to carry fluid under high pressures.

In the device of my former patent, I show a joint, the members of which are held together by means of bolted flange connections. It is a primary object of this invention to provide a joint of the class described with an improved connecting means locking the interfitting parts together, such means being of a nature such that the weight and bulk of the joint are greatly reduced and also being of a nature such that the joint may be easily and quickly dismantled and assembled.

It is another object of this invention to provide a joint of the class described with an improved packing unit to prevent leakage between the interfitting parts, such packing unit being especially valuable for use in connection with gasoline or other similar fluids. In this connection, it is another feature of this packing member that means are provided to hold the packing against its seat and prevent the possibility of its becoming collapsed.

It is a still further object of this invention to provide a joint of the class described, the passage through which is defined by smooth walls, thus eliminating restrictions or projections and the consequent interference to the flow of liquid therethrough.

Another object of this invention is to provide a joint of the class described which is of simple form and construction and may be economically manufactured.

The details in the construction of certain preferred forms of my invention, together with other objects attending its production, will be best understood from the following description of the accompanying drawing which is chosen for illustrative purposes only, and in which—

Fig. 1 is an elevational view partly in section and showing parts broken away;

Fig. 2 is a plan section taken in a plane represented by the line 2—2 in Fig. 1;

Fig. 3 is an inverted plan section taken in a plane represented by the line 3—3 in Fig. 1;

Fig. 4 is a fragmentary sectional elevation showing a modified form of the invention; and Fig. 5 is a fragmentary section showing another modified form of the invention.

More particularly describing the invention as herein illustrated, reference numeral 11 indicates what I may term an outer conduit section or an outer member which is shown as being in the shape of an elbow, and has a suitable connecting member such as a flange 12 on one end thereof.

The other end of the so-called outer member or outer section 11 is shown as being provided with a belled portion 13 which is provided for the purpose of obtaining a section in the so-called outer member 11 which is of greater internal diameter than the remainder of the conduit section.

Reference numeral 14 indicates what I may term, a shelf or shoulder formed on the interior of the belled section 13, such shelf cooperating with a shoulder 15 provided at the upper end of the belled portion to form an annular chamber which receives a packing member generally indicated by reference numeral 16.

Reference numeral 17 indicates, what I may term, an inner member or an inner conduit section. This member is also shown as being in the form of an elbow and has an upper end portion which projects through the belled portion in the outer conduit section, the upper edge 18 thereof engaging a shoulder 19 in the outer conduit section, thereby providing one means of limiting the relative movement of these members in a direction toward each other.

The periphery of the inner member 17 engages the throat of the packing member 16, and any fluid which may leak between the upper edge 18 and the shoulder 19 must enter the chamber 15 where it will be sealed against further movement by the packing member 16. It will be observed that the packing member 16 is carried by a shelf in the outer member 11 so that any pressure exerted by fluid which leaks between the inner and outer members and engages the packing, will be carried by the outer member and will not be effective to create a force which tends to spread the inner and outer members away from each other. In other words, this arrangement of the packing member and the shelf restricts the area within the joint, which is subjected to a pressure tending to separate the joint sections, to the area of the pipe itself, thereby eliminating the added tendency to freeze which would result if the packing member were carried by the inner conduit section.

The packing member in this form of my invention is shown as comprising a ring 20 composed of resilient material, preferably leather, which is U-shaped in cross-section and which receives a split spreader ring 21. The split spreader ring in turn receives a plurality of ring segments 22, the depth or thickness of such segments being greater than the distance from the bottom of the spreader to the top of the packing ring. These split spreader rings are, therefore, interposed between the bottom of the spreader and the shoulder 15, thereby holding the packing in firm engagement with the annular shelf 14.

In assembling this packing ring, the leather ring is first inserted in the chamber 16 before the inner conduit is installed. A portion of the inner flange on the packing ring is then bent inwardly and the split spreader ring is fed into the channel of the packing ring from one of its free ends. Some of the side segments of the spreader ring are then bent downwardly thus holding a portion of the inner flange, or flap, of the packing ring down, and the various ring segments 22 are forced into the opening thus made. When the ring segments have all been inserted, the spreader ring and the packing ring are bent up into the normal position, and the outer member or outer conduit section 11 is ready to receive the inner conduit section 17.

The inner conduit section 17 is provided with an annular shelf or shoulder 23 which is positioned so as to lie beneath the annular shelf 14 formed in the outer conduit section. This shelf or shoulder 23 rests upon a bearing ring 24 which in turn is supported by, what I may term, a bushing member 25. To facilitate its installation, this bushing member 25 is preferably formed in two sections which are placed about the inner member prior to its insertion in the bell and are held together by means of a split spring ring 27 which is received in a groove 28 formed in the outer surface of the bushing member.

In addition to the groove 28, the bushing member is provided on its lower edge with a series of notches or recesses 29 which communicate with the groove 28. These recesses prevent the accumulation of dirt and sediment in the groove when the joint is assembled and one of the recesses, 29' for example, is positioned so as to receive downwardly projecting lugs 30 and 31 formed on the free ends of the split spring ring 27. In assembling the device, these lugs may be grasped by a pair of pliers, or other suitable tool, so as to compress the split spring ring completely into the annular recess 28, the depth of which is equal to or greater than the radial width of the ring 27. When compressed in this manner, the inner member with its bushing can be inserted in the bell of the outer member to a point at which the recess 28 is in registration with a corresponding annular recess 33 in the outer member. When the parts are in this position, the split spring is released and is forced by its own resiliency into the position shown in Fig. 1 where it engages corresponding shoulders or parts in the recesses of both the lock bushing 25 and the outer member 11. In this manner the split spring ring is effective to hold the parts against movement away from each other and since the upper edge 18 and the shoulder 19, or the annular shelves 14 and 23, are effective to prevent inward movement of the members relative to each other, it will be seen that this construction provides a unit in which the parts are positively locked against axial movement, but in which they are free to rotate relative to each other.

In order to prevent the inadvertent compression of the split spring ring and the consequent release of the joint sections when they are under pressure, I provide, what I may term, a spreader block 34 which is shown as being mounted between the free ends or between the lugs 30 and 31 on the split spring ring and is held in proper position relative to the bell or the outer member by means of a suitable pin or screw 35. Although I have shown the joint in Fig. 1 as being of a simple swing type, it will be understood that by placing a similar joint construction on both ends of the elbow or outer section 11 or by constructing both ends of the inner section 17 for reception in such outer sections, I may obtain a joint having a universal action.

In the form of my invention shown in Fig. 4, I show a joint construction which is similar in a general way to the joint shown in Fig. 1. This joint differs from the joint shown in Fig. 1 in that the outer member 40 is not provided with an annular shelf, but the split bushing 41 has an annular recess 42 which receives an annular flange 43 on the inner section 44. The bushing 41 is secured in the outer member by means of threaded screw members 45 which are received in registering recesses 46 and 47 formed in the bushing and the outer member respectively. In this manner, the packing, which rests on a washer 41' on the upper edge of the bushing, is in effect carried by the outer member. The packing 48, in this form of my invention, is shown as comprising a conventional rubber ring type of packing.

The form shown in Fig. 5, in which the parts corresponding to those shown in Fig. 1 bear the same reference numeral distinguished by the prime mark ('), is identical in all respects with the form shown in Fig. 1 except that the bushing 25' is in threaded engagement with the belled portion 13' of the outer member 11' as indicated at 49. This bushing may be provided with recesses 50 to receive a spanner wrench or other similar tool.

It is to be understood that, while I have herein described and illustrated one preferred form of my invention, the invention is not limited to the precise construction as described above, but includes within its scope whatever changes fairly come within the spirit of the appended claim.

I claim as my invention:

A conduit connection of the class described embodying: an outer conduit section; an inner conduit section extending into said outer conduit section and having a flange thereon within said outer conduit section; a split bushing removably mounted in said outer conduit section and surrounding said inner conduit section, said bushing having a groove therein containing said flange; means for locking said bushing in said outer conduit section; and packing means mounted on the top of said bushing with annular faces engaging the exterior of said inner conduit section and the interior of said outer conduit section, respectively.

CHARLES G. BANKS.